United States Patent
Jeong

(10) Patent No.: US 7,860,459 B2
(45) Date of Patent: Dec. 28, 2010

(54) METHOD AND SYSTEM FOR AUTOMATICALLY ESTABLISHING A CONNECTION BETWEEN A MASTER TERMINAL AND A SLAVE DEVICE

(75) Inventor: Jae-Woong Jeong, Seoul (KR)

(73) Assignee: Samsung Electronics Co., Ltd (KR)

( * ) Notice: Subject to any disclaimer, the term of this patent is extended or adjusted under 35 U.S.C. 154(b) by 550 days.

(21) Appl. No.: 11/854,471

(22) Filed: Sep. 12, 2007

(65) Prior Publication Data

US 2008/0063030 A1    Mar. 13, 2008

(30) Foreign Application Priority Data

Sep. 12, 2006    (KR) ................. 10-2006-0088281

(51) Int. Cl.
*H04B 7/00*     (2006.01)
(52) U.S. Cl. .................. 455/41.2; 455/507; 455/510
(58) Field of Classification Search ............ 455/41.2, 455/41.3, 458, 500, 507, 510, 414.3; 370/350, 370/503, 337; 375/354
See application file for complete search history.

(56) References Cited

U.S. PATENT DOCUMENTS 6,711,151 B1    3/2004    Ziegler

2005/0152376 A1    7/2005    Itoh
2006/0094402 A1    5/2006    Kim
2007/0111739 A1    5/2007    Hamada et al.

FOREIGN PATENT DOCUMENTS

| CN | 1547829 | 11/2004 |
| EP | 1 513 292 | 3/2005 |
| EP | 1 538 791 | 6/2005 |
| KR | 1020060039810 | 5/2006 |

*Primary Examiner*—Eugene Yun
(74) *Attorney, Agent, or Firm*—The Farrell Law Firm, LLP

(57) ABSTRACT

Disclosed is a method for quickly and conveniently establishing a connection between a master terminal and a slave device communicating with each other using Bluetooth. The slave device implements a special direct connection mode in which the slave device can be directly connected to the master terminal. When a user operates the slave device, the direct connection mode can be selected. The slave device notifies the master terminal of the direct connection mode. The master terminal establishes the direct connection with the slave device through paging without a slave address selection process. Since the direct connection with a target slave can be established without an address selection process, a time required for establishing a connection between the master and the slave can be significantly shortened, and also, the number of process steps can be reduced.

12 Claims, 4 Drawing Sheets

METHOD AND SYSTEM FOR AUTOMATICALLY ESTABLISHING A CONNECTION BETWEEN A MASTER TERMINAL AND A SLAVE DEVICE

PRIORITY

This application claims the priority under 35 U.S.C. §119 (a) to Korean Patent Application, which was filed in the Korean Intellectual Property Office on Sep. 12, 2006 and assigned Serial No. 2006-88281, the disclosure of which is hereby incorporated by reference.

BACKGROUND OF THE INVENTION

1. Field of the Invention

The present invention generally relates to a method for automatically establishing a connection between a master terminal and a slave device, and more particularly to a method and system for automatically establishing a connection between a master terminal and a slave device using Bluetooth® (hereinafter "Bluetooth") communication.

2. Description of the Related Art

A Bluetooth system is constructed with one master Bluetooth device and multiple slave devices. A master is a Bluetooth device for generating a service and slaves are Bluetooth devices for receiving a service dependent on the master, i.e., the Bluetooth device for generating the service becomes the master. When a service is generated from a specific Bluetooth device, the master that generates the service performs an inquiry process to acquire synchronization with the slaves in a standby state, that is, to determine whether the peripheral slaves are present.

On the other hand, a method for establishing a connection between a master device and other slave devices using Bluetooth communication will be described with reference to FIG. 1. FIG. 1 is a typical flow diagram illustrating signals transmitted and received between a master 10 and a slave 11. In FIG. 1, the slave 11 is at least one Bluetooth device.

First, when the slave 11 is initialized, the slave 11 is set to inquiry scan mode as in step 20. The master 10 makes an inquiry to determine whether peripheral slaves 11 are present in step 30. That is, when a user searches for the peripheral slaves 11 using the master 10, the master 10 starts searching for the peripheral slaves 11 by making the inquiry. All slaves 11 operating in discoverable mode send inquiry responses, in response to the inquiry in step 40, to the master 10. At this time, a searched slave 11 includes its own information in a Frequency Hop Synchronization (FHS) packet and then sends the FHS packet to the master 10. For example, the information includes a Bluetooth Device Address (BD_ADDR), Clock Information (CLKN), an error detection and correction signal or Bose-Chaudhuri-Hocquenghem (BCH) code, etc.

The master 10 displays a list of addresses of all searched slaves 11 upon receiving the inquiry responses from the peripheral slaves 11 in step 50. When the addresses of the searched slaves 11 are displayed on a search image, the user can press a connect button to select an address of a target slave to be connected. Then, the master 10 determines whether a specific slave address is selected in step 60. If the specific slave address is selected, the master 10 displays a password input window on its search image. When the user inputs a password, the master 10 sequentially performs paging and pairing processes with the target slave to be connected. While performing a page scan mode as in step 70, the slave 11 detects that the master 10 starts paging in step 80. Through this paging process, the master 10 acquires hopping sequence synchronization with the slave 11 using an address, clock information, and the like. The slave 11 is actually connected to the master 10 in step 90.

As described above, the Bluetooth connection process is divided into an inquiry process in which a master sends an inquiry to search for slaves and a paging process in which the master attempts an actual connection with a target slave. However, the Bluetooth connection process divided into the two processes may be troublesome to the user. In addition, the user should wait for a long time until the connection with the target slave is established.

The master must perform a process of acquiring a target slave address for a connection with a target slave. For example, if a mono headset without a special screen is the master, the mono headset must send searched slave addresses to an external device connected via a wired link such that target slave addresses can be detected. When a liquid crystal display of the external device displays the searched slave addresses, a user can view the searched slave addresses.

After an inquiry is made as described above, inquiry responses may be received from a significant number of slaves. Since an address list should be created and displayed on the basis of the inquiry responses, a user must wait for the address list to be received in an idle screen state. This is very inconvenient for the user. In addition, when a Bluetooth device has a small Liquid Crystal Display, (LCD) the user must retrieve addresses one by one while scrolling. When no liquid crystal display is provided, an additional procedure should be performed to retrieve a target slave address and may be troublesome to the user.

SUMMARY OF THE INVENTION

An aspect of the present invention is to address at least the above problems and/or disadvantages and to provide at least the advantages described below. Accordingly, an aspect of the present invention is to provide a method and system for automatically establishing a connection between a master terminal and a slave device using Bluetooth communication.

An aspect of the present invention is to provide a method and system for automatically establishing a connection between a master terminal and a slave device that can quickly and conveniently establish the connection between the master terminal and the slave device using Bluetooth communication.

In accordance with an aspect of the present invention, there is provided a method for automatically establishing a connection between a master terminal and a slave device, including: performing a scan process for an inquiry from the master terminal when the slave device is started; providing the master terminal with an inquiry response including information indicating whether a direct connection is required when the inquiry is received in the scan process; determining, by the master terminal, whether the slave device requests the direct connection on a basis of the information indicating whether the direct connection is required in the received inquiry response; acquiring an address of the slave device requesting the direct connection from the received inquiry response when the direct connection request is determined to be present; and performing, by the master terminal, paging to the acquired address and establishing a connection with the slave device.

In accordance with an aspect of exemplary embodiments of the present invention, there is provided a system for automatically establishing a connection between a master terminal and a slave device, including the slave device for performing a scan process for an inquiry from the master terminal when the slave device is started and providing the master terminal with an inquiry response including information indicating whether a direct connection is required when the inquiry is received in the scan process; and the master terminal for determining whether the slave device requests the direct connection on a basis of the information indicating whether the direct connection is required in the received inquiry response, acquiring an address of the slave device requesting the direct connection from the received inquiry response when the direct connection request is determined to be present, performing paging to the acquired address, and establishing a connection with the slave device.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF EMBODIMENTS

Figure 1:
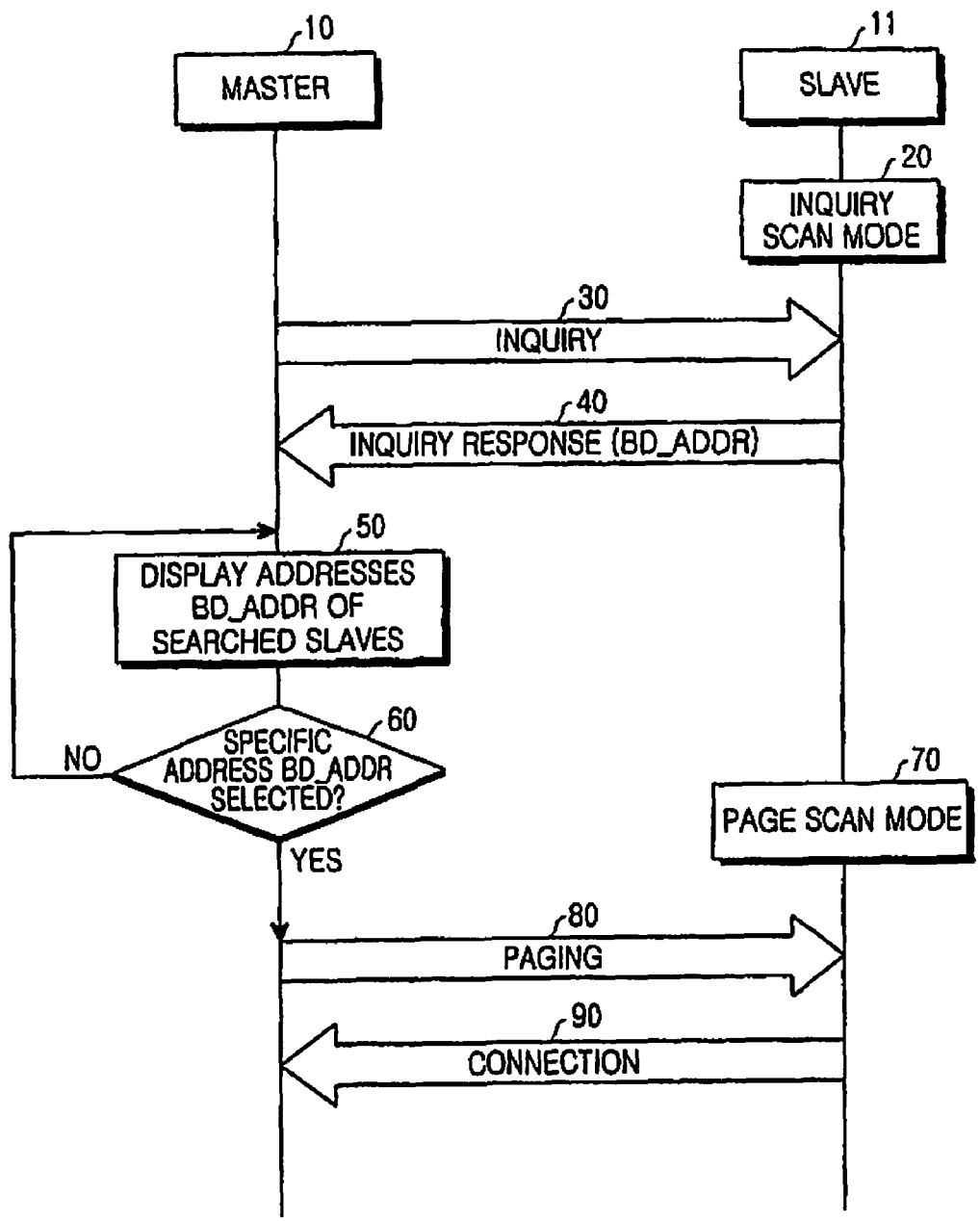
FIG. 1 is a typical flow diagram illustrating signals transmitted and received between a master and a slave.

Exemplary embodiments of the present invention will be described in detail herein below with reference to the accompanying drawings. In the drawings, the same or similar elements are denoted by the same reference numerals even though they are depicted in different drawings. The matters defined in the description such as a detailed construction and elements are provided to assist in a comprehensive understanding of embodiments of the invention. Also, descriptions of well-known functions and constructions are omitted for clarity and conciseness.

The present invention provides a method for quickly and conveniently establishing a connection between a master terminal and a slave device communicating with each other using Bluetooth. For this, the slave device implements special direct connection mode in which the slave device can be directly connected to the master terminal. When a user operates the slave device, the direct connection mode can be selected. The slave device notifies the master terminal of the direct connection mode. The master terminal establishes the direct connection with the slave device through paging without a slave address selection process. Since a direct connection with a target slave can be established without an address selection process, a time required for establishing a connection between the master and the slave can be significantly shortened and a number of process steps can be reduced.

Figure 2:
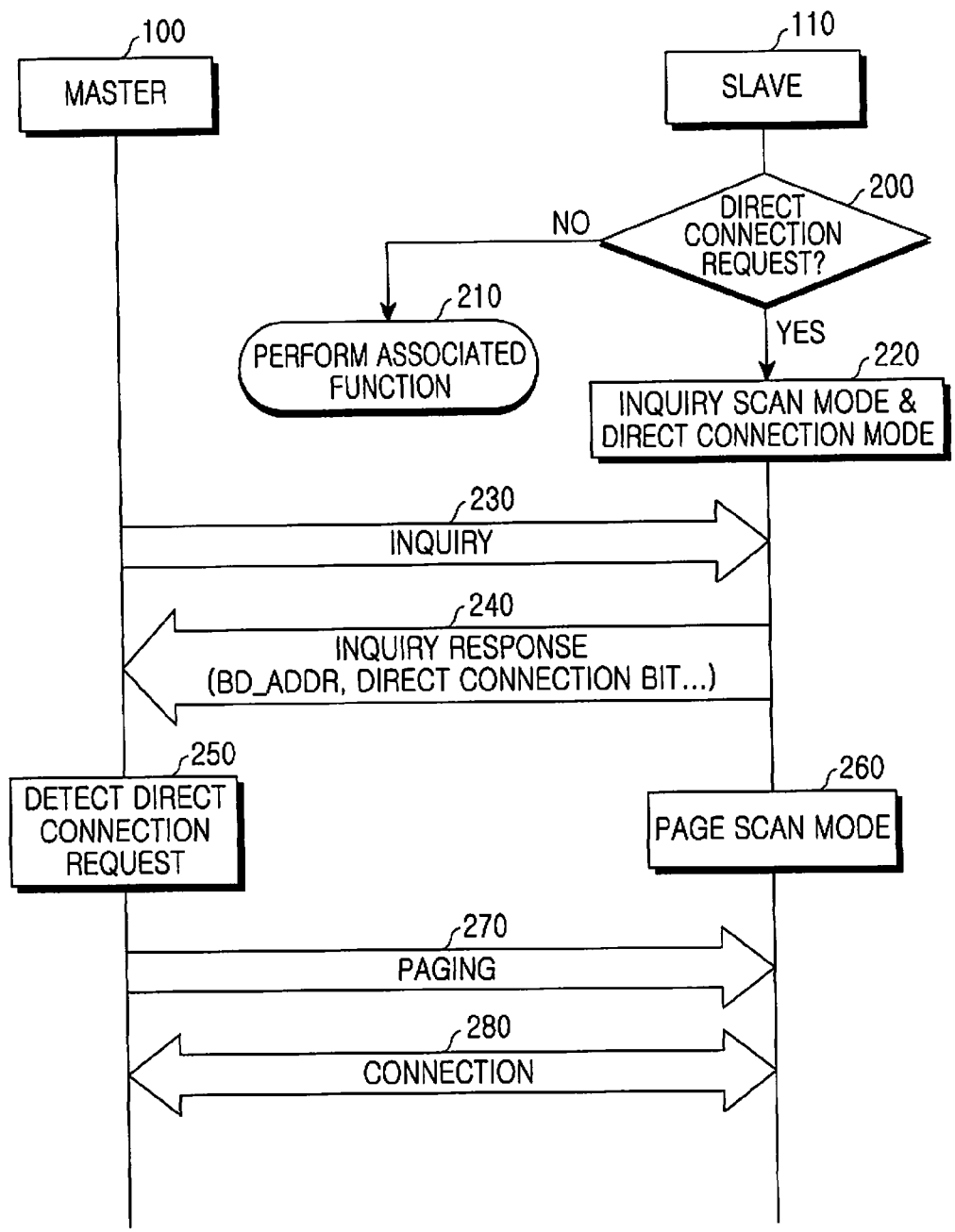
FIG. 2 is a signal flow diagram illustrating an operation for automatically establishing a connection between a master and a slave in accordance with the present invention.

FIG. 2 is a signal flow diagram illustrating an operation for automatically establishing a connection between a master and a slave in accordance with an embodiment of the present invention. In an embodiment of the present invention, an automatic connection method can be very useful when the user desires to connect a master terminal to a specific slave device in a state in which the master terminal and the specific slave device to be connected are close to each other, in the hands of the user. That is, the method is more efficient when the master terminal is connected to the desired specific slave without searching for peripheral slaves.

Referring to FIG. 2, a slave 110 determines whether the user makes a direct connection request in step 200. For example, in the case of a slave, such as a mono headset, the user can select desired a mode by pressing down a power button provided on the headset for different periods of time (key press time). Specifically, when the power button provided on the headset is pressed for a short period of time, the slave 110 can be set to inquiry scan mode and page scan mode, as in a conventional case. However, when the power button is pressed for longer than a predefined time, the slave 110 can be set to direct connection mode to which the present invention is applied.

As described above, the slave 110 determines whether the direct connection request is made on the basis of the key press time of the power button in step 200. If the key press time is not mapped to the direct connection request, the slave 110 proceeds to step 210 to perform an associated function. That is, after entering a standby state using a conventional method, the slave 110 establishes a connection after performing a paging procedure with the master 100.

However, if the direct connection request is made, the slave 110 is set to the inquiry scan mode and the direct connection mode in step 220. Then, the master 100 sends an inquiry to the slave 110 in step 230. In response to the inquiry, the slave 110 sends an inquiry response to the master 100 in step 240. To notify the master 100 that the user has set the direct connection mode, the slave 110 includes not only its Bluetooth Device Address (BD_ADDR), Clock Information (CLKN) and an error detection and correction signal or Bose-Chaudhuri-Hocquenghem (BCH) code, but also a direct connection bit in the inquiry response, and then sends the inquiry response. At this time, the inquiry response is formatted as a Fequency Hop Synchronization (FHS) packet.

Figure 4:
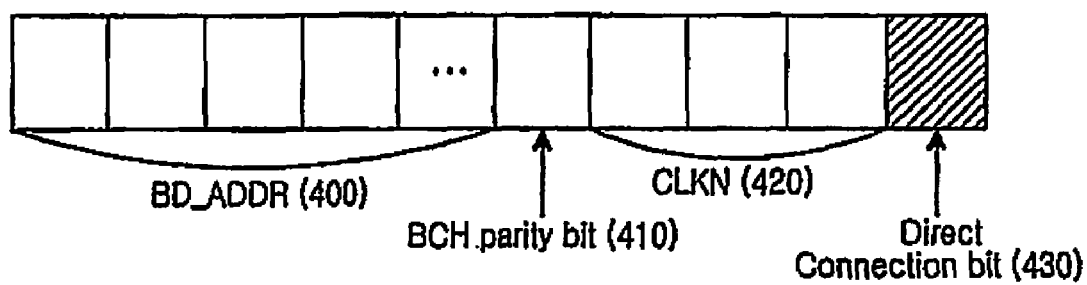
FIG. 4 illustrates a structure of a Frequency Hop Synchronization (FHS) packet in accordance with an embodiment of the present invention.

Next, an FHS packet structure to which the present invention is applied will be described with reference to FIG. 4. As illustrated in FIG. 4, the FHS packet includes a new direct connection bit as well as BD_ADDR 400, a BCH parity bit 410 and a CLKN 420. The FHS packet is a control packet including clock information and Bluetooth address information of the slave 110. A Bluetooth device address is set in the BD_ADDR 400 field. An error detection and correction signal is set in the BCH parity bit 410 field. Native clock information is set in the CLKN 420 field. In particular, a value for determining whether the master 100 should immediately perform paging is set in a direct connection bit 430 field. If the direct connection bit 430 is set to 1, the master 100 immediately performs paging to establish a connection when receiving an inquiry response from the slave 110 (FIG. 2). Otherwise, if the direct connection bit 430 is set to 0, the master 100 enters the standby state by determining that the slave 110 does not intend to directly connect to the master 100. If the user sets the direct connection mode when the slave 110 is started, the slave 110 sends the inquiry response in which the direct connection bit 430 is set to 1 and performs the page scan mode as in step 260.

Meanwhile, the master 100 reads a value of the direct connection bit set in the FHS packet corresponding to the inquiry response and detects a direct connection request in step 250. The master 100 performs paging to the slave 110 in step 270 and establishes the connection with the slave 110 in step 280.

Next, a control process in which the master 100 simply and conveniently communicates with the slave 110 using Bluetooth communication will be described with reference to FIG.

Figure 3:
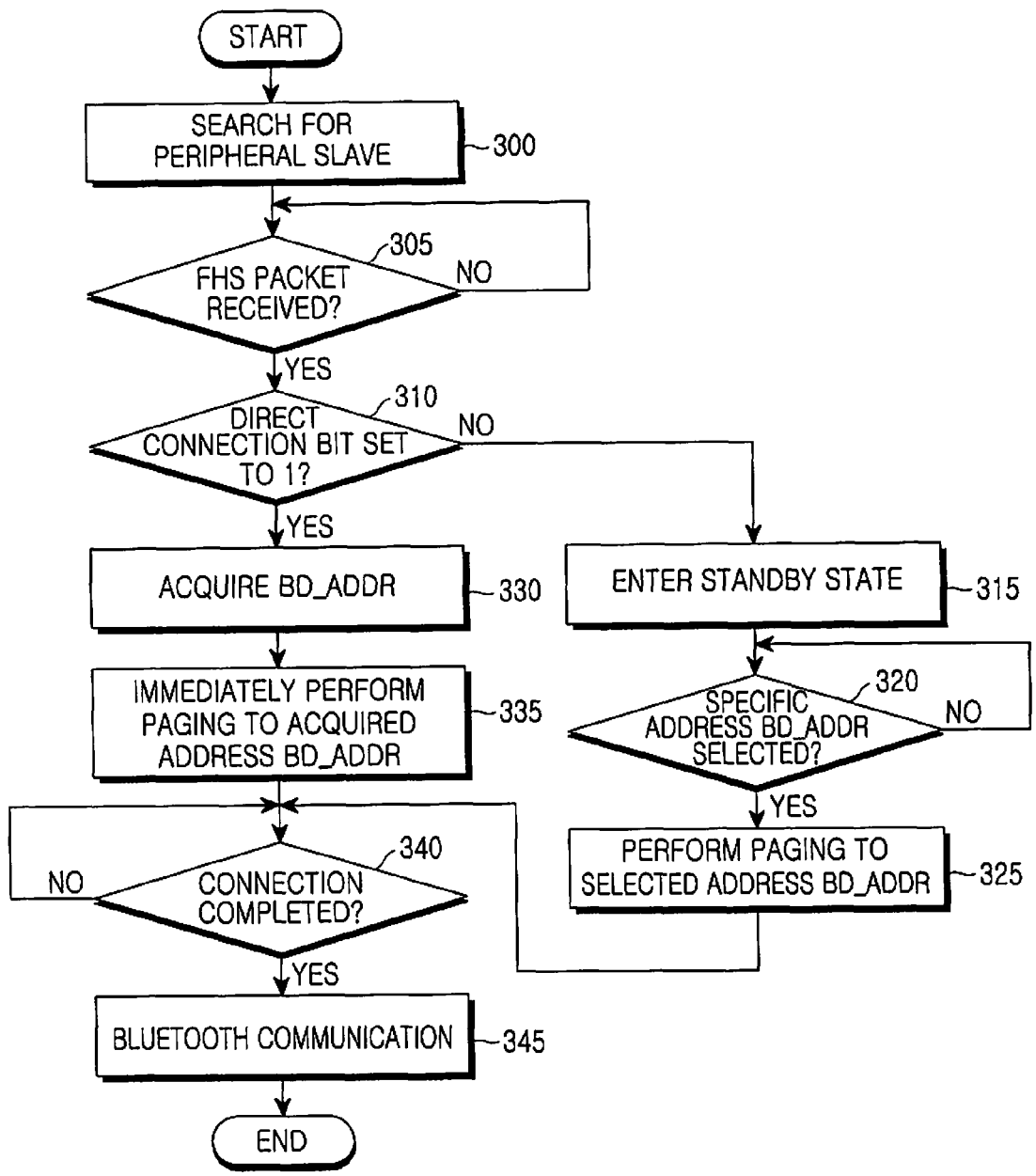
FIG. 3 is a flow diagram illustrating a control operation of the master for automatically establishing a connection in accordance with the present invention.

3. FIG. 3 is a flow diagram illustrating a control operation of the master for automatically establishing a connection in accordance with an embodiment of the present invention.

Referring to FIG. 3, the master 100 sends an inquiry to search for a peripheral slave in step 300. The master 100 determines whether an FHS packet corresponding to an inquiry response is received in step 305. Upon determining that the FHS packet is received, the master 100 proceeds to step 310 to read a direct connection bit from the FHS packet with the structure as illustrated in FIG. 4 and to determine whether the direct connection bit is set to 1, i.e., the master 100 determines whether the direct connection mode is set in the slave 110.

Upon determining that the direct connection bit is not set to 1, the master 100 proceeds to step 315 to enter the standby state by determining that the slave 110 does not intend to be directly connected to the master 100. The master 100 collects various types of inquiry response information, such as BD_ADDR, from other peripheral slaves, generates an address list of the other peripheral slaves on the basis of a collection result, and displays the address list on a screen. Then, the master 100 determines whether the user selects a specific address BD_ADDR from the address list in step 320. Upon determining that the specific address BD_ADDR is selected, the master 100 performs paging to the selected address BD_ADDR in step 325. That is, the master 100 performs paging to a slave with the selected address BD_ADDR. When the user does not select any address BD_ADDR, the remaining operations related to a slave are delayed.

Otherwise, if it is determined that the direct connection bit is set to 1 in step 310, the master 100 determines that the slave 110 requests a direct connection with the master 100. Then, the master 100 acquires an address BD_ADDR of the slave 110 requesting the direct connection included in an FHS packet in step 330 and immediately performs paging to the acquired address BD_ADDR in step 335. That is, the master 100 immediately performs paging to the slave 110 requesting the direct connection without entering the standby state for receiving inquiry responses from other slaves. After paging, the master 100 determines whether a connection with the associated slave is completed in step 340. When the connection is completed, the master 100 proceeds to step 345 to communicate with the associated slave using Bluetooth.

Upon acquiring an address BD_ADDR of a slave requesting a direct connection in the present invention as described above, a master can be one-to-one connected to the slave without waiting for addresses BD_ADDR to be received from all peripheral slaves in the standby state. A user can immediately connect the master to the target slave even though he/she does not know addresses BD_ADDR of all slaves. Conventionally, two distinct processes are performed sequentially: searching for peripheral slaves using a master and then connecting the master to a target slave. However, the present invention can simply and conveniently connect the master to the target slave in one process. Therefore, a connection time can be shortened since a master can be automatically connected to a slave upon finding the slave, in which direct connection mode is set, while searching for peripheral slaves.

In accordance with the present invention as described above, a user can easily connect a master to a target slave even though he/she does not know the address of the target slave. The present invention can simply connect the master to the target slave in only one process if the user desires it. Moreover, the present invention can shorten a connection time since a master can be automatically directly connected to a slave upon finding the slave in which direct connection mode is set while searching for peripheral slaves.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for automatically establishing a connection between a master terminal and a slave device, the method comprising:
   receiving, by the master terminal from the slave device, an inquiry response which has received an input for selecting a connection mode from a user for an inquiry from the master terminal, wherein the inquiry response includes an address of the slave device if the slave device has received an input for a simple connection mode, wherein the inquiry response includes an address of the slave device and direct connection information if the slave device has received an input for a direct connection mode;
   determining, by the master terminal, whether the direct connection information is included in the inquiry response;
   acquiring, by the master terminal, the address of the slave device when the direct connection information is determined to be present in the inquiry response; and
   performing, by the master terminal, paging to the acquired address without entering a standby state for receiving an inquiry response from other slave devices and establishing a connection with the slave device.

2. The method of claim 1, wherein the inquiry response is a Frequency Hop Synchronization (FHS) packet constructed with a Bluetooth Device Address (BD_ADDR) field in which the address of the slave device is set, a Bose-Chaudhuri-Hocquenghem (BCH) parity bit field in which an error detection and correction signal is set, a clock information (CLKN) field, and a direct connection bit field, in which a value is set to determine whether paging to the slave device is required to be immediately performed.

3. The method of claim 1, further comprising:
   receiving inquiry responses from other slave devices in a standby state when the direct connection information is determined to be absent;
   acquiring addresses of the other slave devices from the inquiry responses to the inquiry;
   displaying a list of the acquired addresses and receiving an address selected by a user; and
   performing paging to a slave device with the selected address and establishing a connection with the slave device.

4. The method of claim 1, wherein the input for selecting the connection mode is received when the slave device is started.

5. The method of claim 1, wherein the input for selecting the connection mode is received by pressing a key provided on the slave device and a key press time for the direct connection mode is longer than a key press time for the simple connection mode.

6. A system for automatically establishing a connection between a master terminal and a slave device, the system comprising:
   the slave device for performing a scan process for an inquiry from the master terminal when the slave device is started, receiving an input for selecting a connection mode from a user for the inquiry and providing the master terminal with an inquiry response, wherein the inquiry response includes an address of the slave device if the slave device has received an input for a simple connection mode, wherein the inquiry response includes an address of the slave device and direct connection information if the slave device has received an input for a direct connection mode; and the master terminal for receiving the inquiry response, determining whether the direct connection information is included in the inquiry response, acquiring an address of the slave device when the direct connection information is determined to be present in the inquiry response, performing paging to the acquired address without entering a standby state for receiving inquiry response from other slave devices, and establishing a connection with the slave device.

7. The system of claim 6, wherein the inquiry response is a Frequency Hop Synchronization (FHS) packet constructed with a Bluetooth Device Address (BD_ADDR) field in which the address of the slave device is set, a Bose-Chaudhuri-Hocquenghem (BCH) parity bit field in which an error detection and correction signal is set, a clock information (CLKN) field, and a direct connection bit field in which a value is set to determine whether paging to the slave device is required to be immediately performed.

8. The system of claim 6, wherein the master terminal receives inquiry responses from other slave devices in a standby state when the direct connection information is determined to be absent, acquires addresses of the other slave devices from the inquiry responses to the inquiry, displays a list of the acquired addresses, receives an address selected by a user, performs paging to a slave device with the selected address, and establishes a connection with the slave device.

9. The system of claim 6, wherein the slave device determines whether the input for selecting a connection mode is received.

10. The system of claim 6, wherein the input for selecting a connection mode is received by pressing a key provided on the slave device and a key press time for the direct connection mode is longer than a key press time for the simple connection mode.

11. A slave device for automatically establishing a connection between a master terminal and a slave device, the slave device comprising:

a controller for performing a scan process for an inquiry from the master terminal when the slave device is started and providing the master terminal with an inquiry response when an input for selecting a connection mode is received; and an input unit for receiving the input for selecting a connection mode from a user for the inquiry, wherein the inquiry response includes an address of the slave device if the slave device has received an input for a simple connection mode, wherein the inquiry response includes an address of the slave device and direct connection information if the slave device has received an input for a direct connection mode.

12. The device of claim 11, wherein the input for selecting a connection mode is received by pressing a key provided on the slave device and a key press time for the direct connection mode is longer than a key press time for the simple connection mode.

* * * * *